No. 872,764. PATENTED DEC. 3, 1907.
E. U. SMITH.
APPARATUS FOR GATHERING FRUIT
APPLICATION FILED NOV. 10, 1906.
2 SHEETS—SHEET 1.
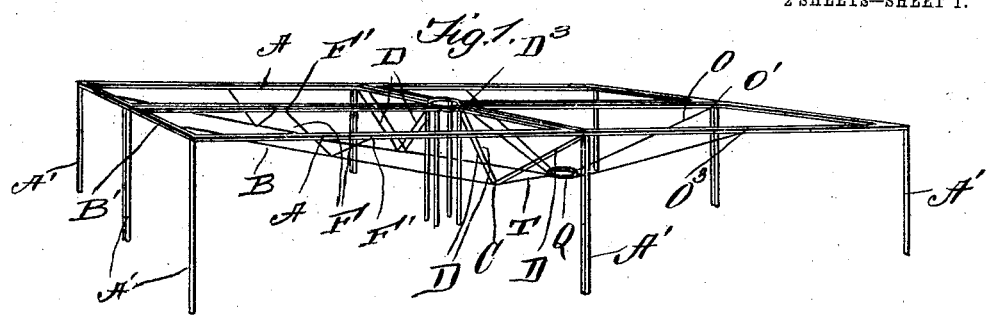
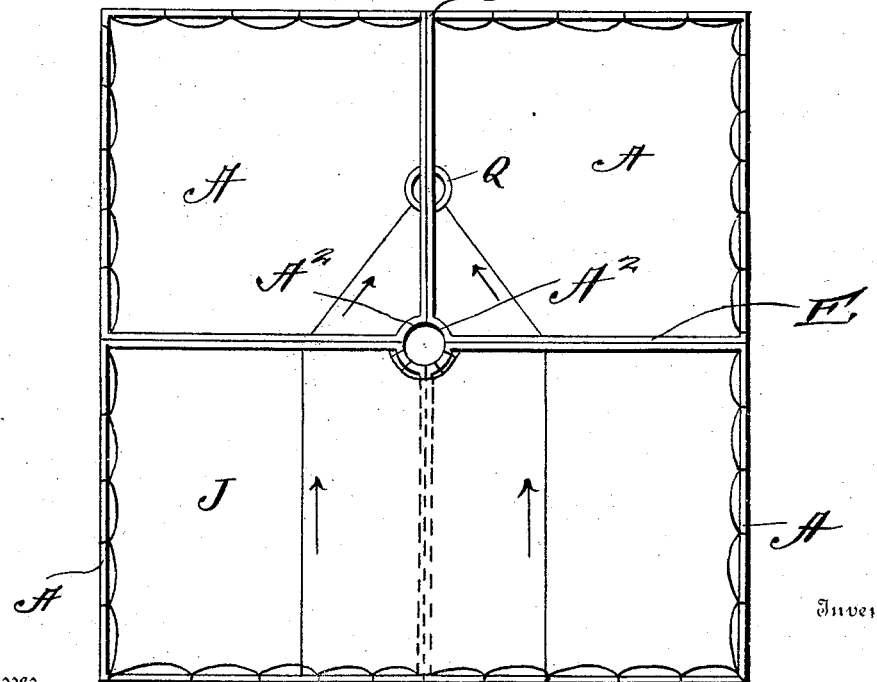

No. 872,764. PATENTED DEC. 3, 1907.
E. U. SMITH.
APPARATUS FOR GATHERING FRUIT.
APPLICATION FILED NOV. 10, 1906.
2 SHEETS—SHEET 2.
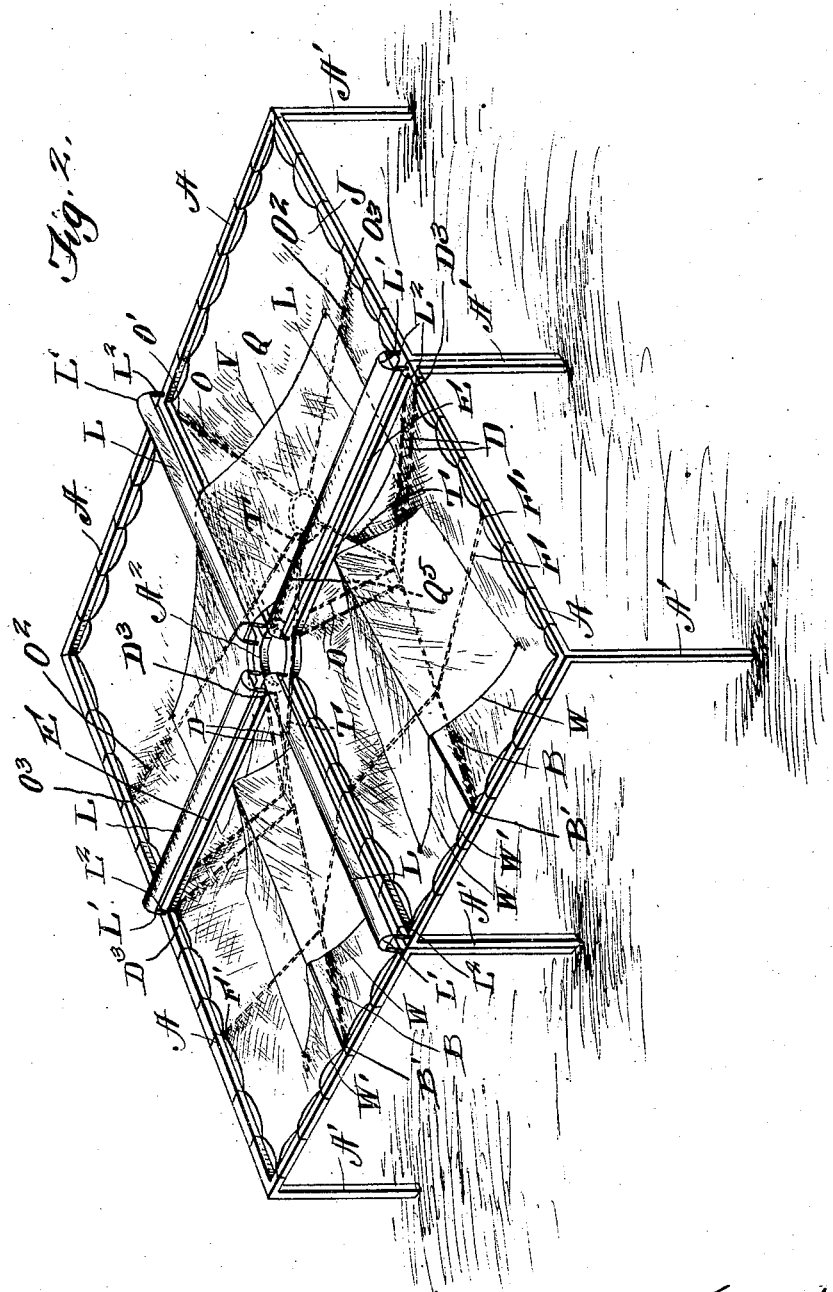
Witnesses
Inventor
Ernest U. Smith
By Franklin H. Hough
Attorney

UNITED STATES PATENT OFFICE.

ERNEST U. SMITH, OF HONEOYE FALLS, NEW YORK.

APPARATUS FOR GATHERING FRUIT.

No. 872,764.　　　　Specification of Letters Patent.　　　　Patented Dec. 3, 1907.

Application filed November 10, 1906. Serial No. 342,900.

*To all whom it may concern:*

Be it known that I, ERNEST U. SMITH, a citizen of the United States, residing at Honeoye Falls, in the county of Monroe and State of New York, have invented certain new and useful Improvements in Apparatus for Gathering Fruit; and I do hereby declare the following to be a full, clear, and exact description of the invention, such as will enable others skilled in the art to which it appertains to make and use same, reference being had to the accompanying drawings, and to the letters and figures of reference marked thereon, which form a part of this specification.

This invention relates to new and useful improvements in fruit gathering apparatus, and the object of the invention is to produce a simple and efficient device which may be positioned underneath the branches of a tree and adapted to catch the fruit as it falls upon the canvas, the fruit afterward rolling by gravity and conducted into a receptacle or pile at one location underneath the canvas.

My invention comprises various details of construction and combinations and arrangements of parts which will be hereinafter fully described and then specifically defined in the appended claims.

I illustrate my invention in the accompanying drawings, in which:—

Figure 1 is a perspective view of my fruit gathering apparatus showing the canvas removed, illustrating the arrangement of the framework. Fig. 2 is a perspective view of the apparatus and Fig. 3 is a top plan view illustrating by arrows the courses which the fruit takes in rolling down the inclines the protecting devices shown in Fig. 2 being removed.

Reference now being had to the details of the drawings by letter, the frame of the apparatus is made preferably in sections. In the drawings, I have illustrated four similar sections, each designated by letter A and preferably of rectangular or square shape and supported by a leg A' at each corner. The inner corner of each section has a recessed portion A², the four of which recessed sections when placed together, forming a circular-outlined opening adapted to surround the trunk of a tree, under the branches of which the fruit gathering frame is to be set up for use—

B B designate rods, each being secured to the outer rail of two of the sections and fastened at B'. Each of said rods is disposed at an inclination and each is fastened at its inner end to the rods D, which latter are disposed at inclinations and their upper ends fastened as at D³ to the rails E of the sections A, as clearly shown in the drawings. Said rods or strips B are reinforced and braced by the inclined rods F, which rods F are fastened at their outer ends, as at F', to the opposite rails of the section.

In Fig. 1, it will be noted that the rod or strip O extends from the outer corner O' of one of the sections A down to a ring Q, which ring forms the marginal edge of an exit aperture through which the fruit is allowed to drop. The rods O² are connected at their inner ends to said ring Q and their outer ends are fastened at O³ to the side rails of the sections A. Rods T are connected at corresponding ends to the ring Q and their other ends fastened to the lower ends of the rods D. A rod Q⁵ is fastened at its lower end to said ring Q and its upper end is fastened to one of the sections A⁴ adjacent to its cut away portion.

A suitable canvas covering J is placed over the frame described, affording upon each section an inclined trough-shape portion down which the fruit is allowed to roll by gravity to its lowest portion where it may make exit through the ring Q.

In order to protect the fruit from being bruised as it falls upon the apparatus and to prevent the falling fruit from striking the frame of the apparatus, protecting strips are provided, designated in the drawings by letter W, which protecting strips are supported by the rods W' which connect the opposite rails of the sections A directly above the rods B, the ends of the protecting strips W being fastened at opposite edges to the canvas covering J, as shown clearly in Fig. 2 of the drawings. By the provision of these protecting strips W, forming inclined surfaces down which the fruit is adapted to roll, the force of the dropping fruit will be broken.

The protecting strip V is placed over the adjacent meeting rails of the sections A⁴ and the ends of said strip V fastened to the canvas covering J in the manner shown clearly in Fig. 2 of the drawings and forming means for deflecting the fruit which falls upon said strip V.

In order to protect the fruit from striking the meeting rails of the four sections, I provide the covers L, preferably of canvas or any other suitable fabric, the outer ends of which are fastened at L' to the arched-shape rods L² over which fabric is stretched.

In adjusting my fruit gathering apparatus for use, the sections are placed about the trunk of the tree and the canvas spread upon the frame and held in place in any suitable manner, affording the various inclined surfaces down which the fruit may roll as it falls from the tree. By the provision of the protecting canvas strips, it will be noted that the force of the falling fruit will be broken and prevented from coming in contact with the fruit which rolls down the under canvas surfaces, thereby insuring the fruit from being bruised by contact incident to their falling from the tree.

What I claim is:—

1. A fruit gathering apparatus comprising a frame made up of four sections adapted to fit together and cut away to fit about the trunk of a tree, each section having rods fastened thereto at their outer ends extending downward and inward and secured together at their inner ends, a canvas covering adapted to be supported by said rods and fit the edges of said frame sections and forming troughs, deflecting strips over portions of said troughs, and protecting means over the meeting edges of said sections of the frame, as set forth.

2. A fruit gathering apparatus comprising a frame made up of four sections adapted to fit together and cut away to fit about the trunk of a tree, each section having inclined rods fastened thereto at their outer ends extending downward and inward and secured together at their inner ends, a canvas covering adapted to be supported by said rods and fit the edges of said frame sections and forming troughs, deflecting strips over portions of said troughs, arched members rising from the meeting corners of the frame sections and protecting strips fastened over said arched members, as set forth.

3. A fruit gathering apparatus comprising a frame made up of four sections adapted to fit together and cut away to fit about the trunk of a tree, each section having inclined rods fastened thereto at their outer ends extending downward and inward and secured together at their inner ends, a canvas covering adapted to be supported by said rods and fit the edges of said frame sections and forming troughs, deflecting strips over portions of said troughs, arched members rising from the meeting corners of the frame sections, protecting strips fastened over said arched members, and a ring at the lowest portion of the canvas covering forming an exit through which the fruit is adapted to fall, as set forth.

4. A fruit gathering apparatus comprising a frame made up of four sections adapted to fit together and cut away to fit about the trunk of a tree, each section having inclined rods fastened thereto at their outer ends extending downward and inward and secured together at their inner ends, a canvas covering adapted to be supported by said rods and fit the edges of said frame sections and forming troughs, deflecting strips over portions of said troughs, arched members rising from the meeting corners of the frame sections, protecting strips fastened over said arched members, a ring forming an exit through which the fruit is adapted to fall, and protecting strips extending over said ring, as set forth.

In testimony whereof I hereunto affix my signature in the presence of two witnesses.

ERNEST U. SMITH.

Witnesses:
  C. A. SHUART,
  J. S. BROWN.